United States Patent [19]

Gottschalk

[11] 4,276,798

[45] Jul. 7, 1981

[54] FLAT CABLE CONDUCTOR SEPARATING APPARATUS

[76] Inventor: Klaus W. Gottschalk, 934 Heatherstone Way, Sunnyvale, Calif. 94087

[21] Appl. No.: 96,616

[22] Filed: Nov. 23, 1979

[51] Int. Cl.³ .............................................. B26D 1/24
[52] U.S. Cl. ...................... 83/430; 81/9.51; 83/447; 83/450; 83/522; 83/675
[58] Field of Search .............. 83/450, 449, 447, 444, 83/675, 500–503, 425, 430, 522; 225/97; 81/9.51

[56] References Cited

U.S. PATENT DOCUMENTS

| | | | |
|---|---|---|---|
| 1,067,269 | 7/1913 | Palmer | 83/450 X |
| 1,939,246 | 12/1933 | Antonsen | 225/99 X |
| 3,101,104 | 8/1963 | Sullivan | 83/447 X |
| 3,314,321 | 4/1967 | Fauconniere | 83/444 X |
| 3,521,508 | 7/1970 | Kamimura et al. | 81/9.51 |
| 3,575,329 | 4/1971 | Hannabery | 225/97 |
| 3,750,512 | 8/1973 | Gotham et al. | 83/447 X |
| 3,771,398 | 11/1973 | Schaefer et al. | 83/500 X |
| 3,782,227 | 1/1974 | Veenendaal | 81/9.51 |
| 3,817,127 | 6/1974 | Soeller | 81/9.51 |

*Primary Examiner*—Frank T. Yost
*Attorney, Agent, or Firm*—Thomas H. Olson

[57] ABSTRACT

A cable separator including a pair of slotted rolls that define uniformly spaced apart slitting or shearing sites which are spaced from one another by a distance corresponding to the conductor spacing of a flat cable. A guiding structure at the inlet of the slitting sites for guiding the flat cable thereinto at a proper transverse position to assure that slitting takes place between adjacent conductors. The guiding structure has a plurality of longitudinally extending spring loaded ribs that are spaced from one another by an integral multiple of the interconductor spacing of the cable. A pivotal clamping frame mounted at the inlet of the guiding structure and a mechanism for adjusting the clamping frame to adjust the distance over which the cable conductors are separated by the apparatus.

7 Claims, 7 Drawing Figures

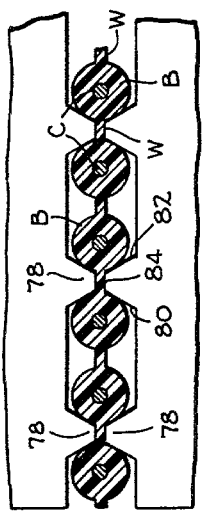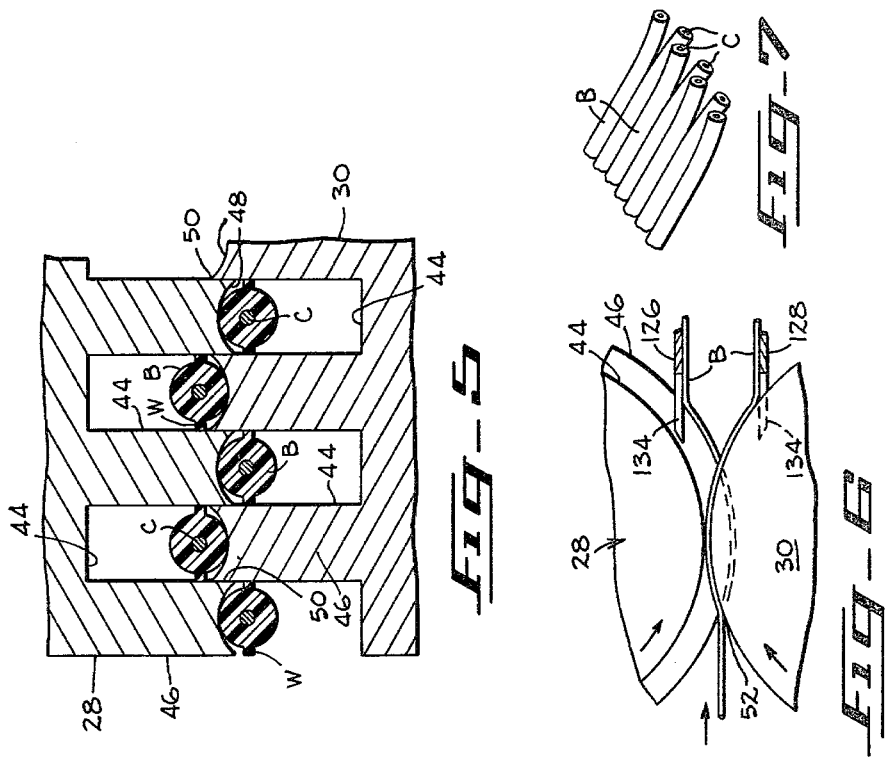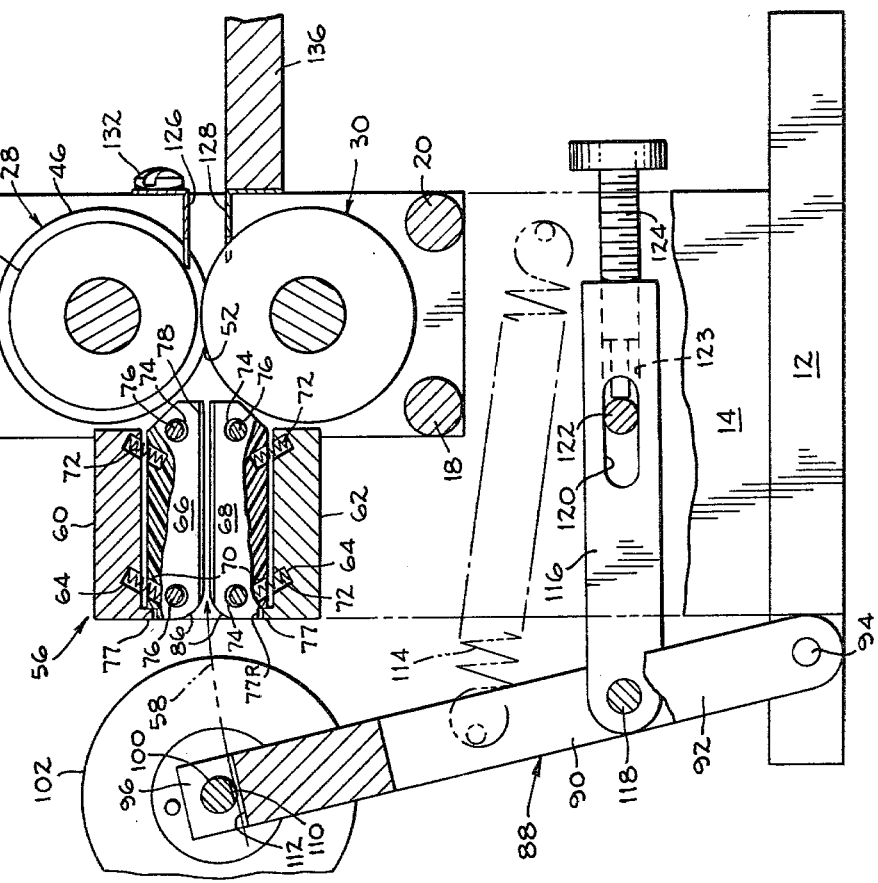

FLAT CABLE CONDUCTOR SEPARATING APPARATUS

BACKGROUND OF THE INVENTION

1. Field of the Invention

This invention relates to apparatus for separating the conductors of a flat cable of the type widely used in computer and like electronic environments, such separation being necessary before the insulation on the conductors is stripped and the conductors are terminated.

2. Description of the Prior Art

In manufacturing flat multiconductor cables, the uniformity of interconductor spacing is typically excellent but the width of insulation at the lateral edges of the cable can and does vary. Accordingly, many prior art conductor separating devices which rely for alignment on the side edges of the cable produce unsatisfactory results such as damaging the insulation surrounding each conductor. An example of such device is shown in U.S. Pat. No. 3,575,329 which discloses two rollers adapted to shear the web of insulation between adjacent conductors and an input platform having guide rails for engaging the lateral edges of the flat cable. As previously indicated, imprecision in the straightness and uniformity of the side edges causes misalignment between the rollers and the conductors, which produces unsatisfactory conductor separation.

A separating device disclosed in U.S. Pat. No. 4,046,045 discloses similar cable guides or stops in conjunction with a device having reciprocating insulation slitters.

U.S. Pat. Nos. 3,782,227 and 3,817,127 disclose motor driven conductor separators where the flat cable must be positioned manually for proper alignment with the shearing elements in the machine. The accuracy of conductor separation achievable with such machines is dependent upon the care exercised by the operator which does not assure reliability in all circumstances.

U.S. Pat. No. 3,677,116 discloses a conductor separator for flat cables wherein positioning of the conductors with respect to a shear element is achieved by lateral stepped movement of the flat cables by a toothed mechanism. Although apparently satisfactory for its intended purpose, the patented device is slower than devices employing a longitudinal feed.

SUMMARY OF THE INVENTION

A cable separator embodying the present invention includes a pair of slotted rolls which define a plurality of uniformly spaced slitting or shearing sites which are spaced from one another by a distance corresponding to the conductor spacing of the cable, typically 0.050 inches. In longitudinal alignment with the sites there are upper and lower spring loaded members which define longitudinally extending ribs that are aligned with the slitting sites and that are spaced from one another an integral multiple of the interconductor spacing. The distal edges of the ribs are configured so that as flat cable is fed through the spaces between the ribbed members, the ribs tend to move the cable laterally as the ribs enter the slots or depressions between the cables. Thus when the cable reaches the slitting sites, it is aligned so that slitting takes place at the webs between adjacent conductors and not at insulation surrounding the conductors.

An object of the invention is to provide an efficient, quickacting conductor separator which can produce accurate results without significant operator attention. This object is achieved because the above noted ribbed members, which define an inlet path to the slitting sites, are spring loaded so as to permit the flat cable to be manually moved therethrough so as to achieve proper alignment without respect to any side edge guide.

Another object of the invention is to provide a conductor separating device wherein the longitudinal extent of separation can be precisely and conveniently controlled. For accomplishing such object, the present invention provides at the inlet of the above mentioned ribbed members a pivotable clamping frame that has a guide slot aligned with the path formed between the ribbed members. The cable is fed through the slot and through the ribbed members to the slitting sites. The cable is clamped at the slot, and the amount of pivotal movement of the frame is adjustably variable to control the distance that the cable is permitted to move through the slitting sites. Also the present invention provides a calibrated output cable which has suitable graduation to inform the operator how far the cable has moved past the slitting sites.

A further object of the invention is to effect deformation of alternate conductors in opposite directions to facilitate individual handling of the conductors after separation. This object is achieved by providing upper and lower slitted shear rollers at which the slitting is performed and providing alternately spaced stripping fingers for cooperation with the rollers downstream of the slitting site so that after separation alternate conductors are deformed in opposite directions.

The foregoing together with other objects, features and advantages will be more apparent after referring to the following specification and the accompanying drawings.

BRIEF DESCRIPTION OF THE DRAWINGS

FIG. 3 is a side view of the apparatus of FIG. 1 with portions being broken away and sectioned to reveal various internal details.

FIG. 4 is a fragmentary view at enlarged scale of the ribbed alignment guides engaged with a segment of flat cable.

FIG. 5 is a fragmentary cross-sectional view at enlarged scale of the shearing rolls and depicting the shearing action provided thereby.

FIG. 6 is a fragmentary view at enlarged scale of the stripping fingers cooperating with the shear rolls.

FIG. 7 is a fragmentary view of a section of flat cable after the conductors thereof have been separated in accordance with the present invention.

DESCRIPTION OF THE PREFERRED EMBODIMENT

Figure 1:
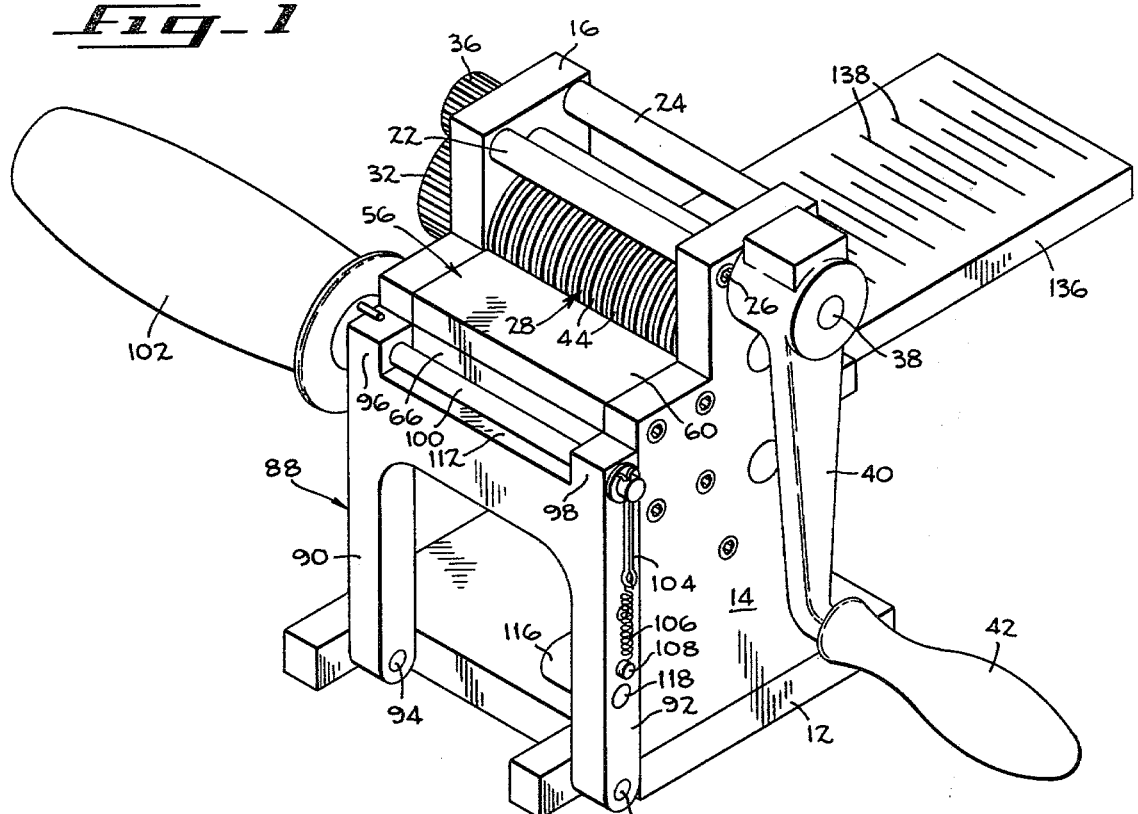
FIG. 1 is a perspective view of a flat cable separator embodying the invention.

Referring more particularly to the drawings, reference numeral 12 indicates a base plate to one edge of which is secured a side plate 14. A side plate 16 is supported rigidly to side plate 14 by means of a pair of lower spacers 18 and 20 and a pair of upper spacers 22 and 24. The ends of the spacers are tapped to receive mounting screws 26 which fix the ends of the spacers to the respective side plates. The side plates are supported in parallel spaced apart relation, the space between the inner surfaces of the side plates being in excess of the width of flat cable to be processed by the device.

Supported for rotation between side plates 14 and 16 are an upper shear roll 28 and a lower shear roll 30. Rigid with an extending axially from the shear rolls are shafts to the outer ends of which are respectively secured drive gears 32 and 34 which mesh with one another to effect simultaneous rotation of the rolls. Meshed with upper drive gear 32 is a drive pinion 36 which is carried on a drive shaft 38 that extends parallel to the shear rolls between side plates 14 and 16. On the end of drive shaft 38 opposite pinion 36 is fixed a crank 40 which has an outward extending handle 42. Thus rotation of the crank will effect rotation of the upper and lower shear rolls.

As seen most clearly in FIG. 5, shear rolls 28 and 30 are formed with a series of circumferentially extending slots 44 to form between adjacent slots a series of circumferentially extending ridges 46. Ridges 46 have a thickness, i.e. a dimension axially of the shear rolls, slightly less than the widths of slots 44 so that the ridges can enter the slots as seen in FIG. 5. A clearance in the range of 0.001 to 0.003 inches having been found a satisfactory clearance. The slots and ridges are of uniform dimension and spaced at intervals corresponding to interconductor spacing of the flat cable, e.g. 0.050 inches. The outer circumferential surfaces of the ridges are formed with a concave arcuate depression 48 which has a radius of curvature greater than that of the individual conductors so that at the opposite extremities of each such concave surface a shear edge 50 is formed. Additionally, from FIG. 5 it will be noted that the depth of slots 44 is substantially greater than the diameter of the conductors and the distance of penetration of the ridges 46, thereby avoiding undue restrictions as the conductors lie in the slots. In one apparatus designed in accordance with the invention, each shear roll has thirty ridges and thirty slots so as to accommodate a flat cable having a corresponding number of conductors.

The shear rolls are mounted so as to form a bite 52 therebetween; a conductor urged into the bite will be drawn through the rollers in response to rotation of the rollers through crank 40. In alignment with bite 52 is mounted an input guide structure 56 which forms a path indicated at arrow 58 aligned with the bite. Input guide structure 56 is supported by an upper cross piece 60 and a lower cross piece 62 which are rigidly fixed to side plates 14 and 16. The lower surface of upper cross piece 60 and the upper surface of cross piece 62 are formed with holes or recesses 64, there being four rectangularly positioned such recesses in each of the cross pieces. As can be seen in FIG. 3, the recesses are slanted toward the left, as viewed in FIG. 3, that is, slanted in a direction opposite the direction of cable feed along path 58 toward bite 52. An angle of slant for recesses 64 and about 30° from vertical has been found satisfactory in one apparatus designed according to the invention.

There are upper and lower guide bodies 66 and 68 mounted between cross pieces 60 and 62, the upper surface of guide body 66 and the lower surface of guide body 68 having slanted bores 70 which are aligned in both position and orientation with recesses 64 in the cross pieces. In each pair of aligned bores and recesses is disposed a compression spring 72 which serves yieldably to urge bodies 66 and 68 toward one another and toward path 58. Bodies 66 and 68 are each formed with a pair of transversely extending through bores 74; extending through each of the through bores 74 is a mounting rod 76. Opposite ends of mounting rods 76 are fixed to side plates 14 and 16. As can be seen in FIG. 3, the diameter of through bores 74 exceeds the outside diameter of mounting rods 76 so as to permit guides bodies 66 and 68 to move away from path 58 and against the force of compression springs 72. The through bores and the mounting rods are dimensioned and positioned to limit the inward movement of guide bodies 66 and 68, preferably to a position at which the guide bodies are not in contact with one another at path 58. Cross pieces 60 and 62 at the extremities thereof remote from the shear rolls are each provided with a boss 77; the opposing surfaces of guide bodies 66 and 68 have complemental rabbet grooves 77R which cooperate with bosses 77 to retain the bodies in place against the force of springs 72.

The lower surface of guide body 66 and the upper surface of guide body 78 define a plurality of longitudinally extending ribs 78. See FIG. 4. Ribs 78 are spaced from one another by an integral multiple of the interconductor spacing of the flat cable. In the specific embodiment shown in FIG. 4, the spacing between adjacent ribs 78 is twice the spacing between conductors in the flat cable. As can be seen, upper and lower bodies 66 and 68 are so mounted that ribs 78 thereof are in alignment with one another on opposite sides of path 58. Ribs 78 are of generally truncated triangular shape and have converging side walls 80 and 82 which facilitate movement of the ribs into the slots between adjacent conductors of the cable. The sloping side walls terminate at a bearing surface 84 which preferably has a width substantially equal to the width of the web, such width in FIG. 4 being greatly exaggerated and enlarged for clarity. The inlet end of bodies 66 and 68, i.e. the end remote from bite 52, are radiused as at 86 to facilitate movement of the flat cable along path 58 between the confronting guide bodies.

For limiting the amount or distance over which the conductors are separated by movement between shear rolls 28 and 30, there is a clamping frame 88 disposed at the inlet end of alignment device 56. The clamping frame has two depending legs 90 and 92 which are pinned at 94 for pivotal movement with respect to base 12. The frame also has upstanding projections 96 and 98 which are formed with aligned transverse bores to support a cam rod 100. Cam rod 100 can be rotated by a handle 102 which is secured thereto. The cam rod is biased to a central position by means of a biasing mechanism that includes a cotter pin 104 that extends from the cam rod and a tension spring 106 which extends between the free end of the cotter pin and a point of attachment 108 to leg 92. In the relaxed condition of cam rod 100, a chordally extending flat 110 formed on the surface of the cam rod is oriented parallel to path 58. Between projections 96 and 98 clamping frame 88 defines a surface 112 which, as can be seen most clearly in FIG. 3, is positioned below the path. Thus, with cam rod 100 in the relaxed position shown in FIG. 3, a flat cable can be fed between flat 110 and surface 112 to input guide structure 56. However, when the cam rod is rotated by applying force on handle 102 against the force of spring 106, the flat cable is clamped between flat 110 and surface 112.

Clamping frame 88 is biased to a vertical position, seen in FIG. 1, by means of a tension spring 114, one end of which is pinned to leg 92 of the clamping frame and the other end of which is pinned to side plate 14. For limiting the degree to which the clamping frame can be pivoted outward, i.e. in a counterclockwise direction as viewed in FIG. 3, there is an adjustable stop formed by a bar 116 one end of which is pinned at 118 to leg 92 of clamp frame 88 and the other end of which defines an elongate slot 120. A pin 122 extends into slot 120 and is fixed to the inner surface of side plate 14. At the end of bar 116 remote from pin 118 there is a threaded bore extending from the end of the bar into slot 120. An adjusting screw 124 is threaded into hole 123, adjustment of the screw effecting adjustment of the amount that the clamping frame can be pivoted outward.

Figure 2:
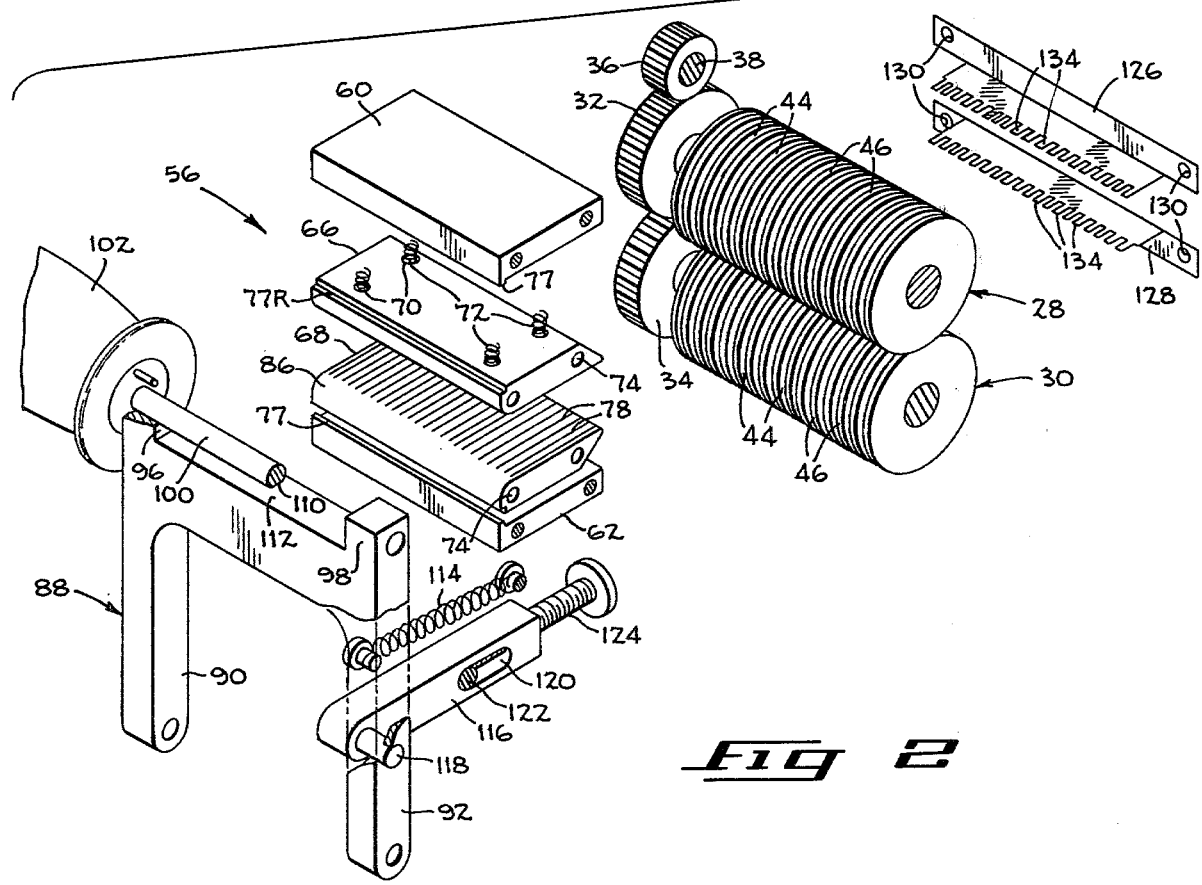
FIG. 2 is an exploded view showing certain operative parts of the device of FIG. 1.

At the outlet end of shear rolls 28 and 30 are provided an upper stripper comb 126 and a lower stripper comb 128. The combs have vertical portions defining mounting holes 130 at opposite ends thereof, the mounting holes admitting screws 132 which are threaded into the edge faces of side plates 14 and 16 to retain the combs in place. As can be seen in FIG. 2, each of the stripper combs has a row of horizontally extending fingers 134 which are sized to enter slots 44 in shear rolls 28 and 30 so as to strip the conductors from the slots after the webs that join the conductors have been sheared. As can be seen in FIG. 5, alternate conductors enter slots in opposite shear rolls so that when the conductors are stripped from engagement in the slots, alternate conductors will be deformed upward and downward as indicated in FIG. 7. Stripper combs 126 and 128 are mounted so that fingers 134 are disposed approximately 30° from the shear site between the rollers, i.e. from the point of tangency between the rollers. This spacing provides optimum deformation of the conductors to facilitate subsequent access to individual conductors.

At the outlet end of the apparatus is supported an outlet table 136. The table is mounted to side plates 14 and 16 in a horizontal position below the path of movement as the separated conductors exit the shear site formed by shear rolls 28 and 30. As can be seen in FIG. 1, the upper surface of table 136 is provided with graduations 138 which are typically arranged in inches and fractions of inches to provide a visual indication of the distance over which the conductors of a cable transported through the shear site are separated.

Before operation of the apparatus is summarized, reference is made to the fragment of flat cable shown in cross section in FIG. 4. The flat cable includes a plurality of wire conductors C each of which is jacketed by an insulative body B of generally cylindrical shape. Extending between adjacent bodies B are insulative webs W which can be integral with bodies B or adhered thereto. Webs W retain the conductors in a flat array and in uniformly spaced relation.

The operation of the embodiment shown in the drawings will now be described. With the parts of the apparatus positioned as shown in FIG. 1, a length of flat cable, the individual conductors of which are to be separated, is moved along path 58 between cam rod 100 and surface 112. Referring to FIG. 3, the end of the flat cable can be moved between ribbed bodies 66 and 68 because of the presence of radiused surface portions 86. Because the ribbed bodies 66 and 68 are yieldably supported by virtue of compression springs 72, the cable can be moved through input guide structure 56 with but little resistance. As the cable traverses ribs 78 in the input guide structure, the resilient force imposed by spring 72 will urge the ribs into the slots between adjacent conductors, thereby effecting slight lateral movement of the cable until rib surfaces 78 contact webs W and webs W are aligned with the shear sites formed by shear rolls 28 and 30. Additionally, bodies 66 and 68 as well as ribs 78 formed on the surfaces thereof have sufficient longitudinal extent that the flat cable will be longitudinally aligned straight into the shear sites when the ribs are in contact with webs W. Such manual insertion of the cable continues until the end of the cable encounters bite 52. Next crank 40 is rotated in a clockwise direction as viewed in FIG. 1 so as to draw the cable into the shear sites formed by the shear rolls. Because the conductors have been properly aligned by movement through input guide structure 56, each individual conductor will enter a concavity 48 on ridges 46 of the shear rolls. Further rotation causes the ridges to enter slots 44 where shearing of the web occurs. Still further rotation brings the conductors into contact with teeth 134 of stripping combs 126 and 128 for delivery onto table 136. Rotation can continue until the ends of the conductors register with an appropriate graduation 138 on the surface of the table. Thereafter the rotation of crank 40 is terminated and the separated cable can be withdrawn by pulling it in the opposite direction.

In those instances where the conductors in a large number of cables are to be separated for a uniform length, clamping frame 88 can be used to advantage. First, after the desired amount of separation is determined, screw 124 is adjusted so that the outward most position of the clamping frame, i.e. the position shown in FIG. 3, establishes the distance that the frame will move from the fully outward position to a vertical position as shown in FIG. 1. After the arc through which the clamping frame can be moved is thus established, the cable is moved through the space between cam rod 100 and surface 112, through input guide structure 56 and into contact with bite 52. The cable is there manually retained while clamping frame is pivoted away from the main frame of the structure, such pivotal movement terminating when screw 124 contacts pin 122 in slot 120. In such position of the clamping frame 88 handle 102 is rotated so that the edges of flat 110 clamp the cable against surface 112. Next handle 40 is rotated to move the cable through the shear sites between rolls 28 and 30, thus pivoting the clamping frame toward a vertical position. When the vertical position of the clamping frame is reached, further movement of the cable is prevented and force on crank 40 is then terminated. Handle 102 is released to permit spring 106 to restore cam rod 100 to a released position shown in FIG. 3 and the cable can be manually withdrawn.

Thus it will be seen that the present invention provides a conductor separating apparatus for flat cables which is highly accurate in that it effects precise transverse alignment of the cable conductors before they reach the shear site. Apparatus embodying the invention can be used very rapidly because the alignment provided by input guide structure 56 is accomplished without effort by or attention of the operator. Accurate separation of the cable is achieved even if the lateral edges of the flat cable are irregular or nonuniform because the side edges are not used for aligning the cable.

Although one embodiment of the invention has been shown and described it will be obvious that other adaptations and modifications can be made without departing from the true spirit and scope of the invention.

What is claimed is:

1. In a conductor separator for separating conductors of a flat cable that has plural conductors and insulation material for retaining the conductors in uniformly spaced apart parallel relation, the insulation forming webs of reduced thickness between adjacent conductors so as to define longitudinally extending slots, the separator being of the type having means for shearing the webs at plural spaced apart sites corresponding to the location of the webs, improved apparatus for guiding the cable toward the shearing sites in precise alignment therewith comprising a first body having a plurality of parallel elongate ribs that are spaced from one another by an integral multiple of the distance between adjacent slots in the cable, a second body having a plurality of parallel elongate ribs indentical in spacing and location to the ribs in said first body and means for mounting said bodies so that said ribs of said bodies confront one another to define a path to said sites, said ribs being aligned with said sites, said mounting means including means for yieldably biasing said bodies and said ribs toward said path.

2. Apparatus for separating conductors of a flat cable of the type having plural conductors and insulation material for retaining the conductors in uniformly spaced apart parallel relation, the insulation forming webs of reduced thickness between adjacent conductors so as to define longitudinally extending slots, said apparatus comprising upper and lower shear rolls defining a bite and being constructed and arranged to shear at plural shear sites corresponding to the location of the insulation webs, means forming a path for guiding flat cable toward said bite, and transverse positioning means including a first body having a plurality of parallel elongate ribs that are transversely spaced from one another by an integral multiple of the distance between adjacent longitudinally extending slots in the cable, said ribs being aligned with said sites and extending toward said path for affording entry thereof into said slots, a second body having plural parallel elongate ribs identical in spacing and location to the ribs of said first body and means for yieldably biasing said first and second bodies toward said path so that the ribs of said second body confront the ribs of said first body and so that a flat cable can be introduced between said ribs of said bodies irrespective of the relative transverse spatial relation between said ribs and said slots, and so that said baising means causes entry of said ribs into said slots and consequent transverse movement of said webs into alignment with said shear sites.

3. Apparatus according to claim 2 including means for limiting movement of said bodies toward said path to maintain said ribs in noncontacting relation to one another.

4. Apparatus according to claim 3 wherein said bodies have an inlet end at the extremities thereof remote from said bite, said bodies being formed to define surfaces that diverge from said path at said inlet end to facilitate introduction of a flat cable therebetween.

5. Apparatus according to claim 2 wherein said transverse positioning means forms an inlet end remote from said shear sites and wherein said apparatus includes controlling means for controlling the distance over which the conductors are separated, said controlling means comprising a frame defining a slot aligned with said inlet end, said slot being dimensioned to receive therethrough said flat cable, means for controllably closing said slot to effect selective clamping of said cable, means for mounting said frame to afford movement of said slot toward and away from said inlet end, and means for adjustably limiting the amount of movement of said slot toward and away from said inlet means.

6. Apparatus according to claim 5 wherein said frame mounting means includes a portion of said frame extending from said slot and having a distal end, means for pivotally supporting said distal end so that said slot traverses an arc about said pivotally supporting means in moving toward and away from said inlet end, said controlling means controlling the amount of pivotal movement of said frame.

7. Apparatus according to claim 2 in combination with a table defining la substantially flat surface in receiving relation to said shear sites at the outlet end thereof so that the cable traverses said surface at the outlet of said shear sites and a plurality of visible graduations on said surface for indicating the distance of travel of said cable through said shear sites.

* * * * *